United States Patent [19]

Kuri

[11] 4,251,923
[45] Feb. 24, 1981

[54] METHOD FOR DRYING WATER-CONTAINING SUBSTANCES

[75] Inventor: Setuya Kuri, Kamakura, Japan

[73] Assignee: Kuri Chemical Engineers Incorporated, Tokyo, Japan

[21] Appl. No.: 65,434

[22] Filed: Aug. 10, 1979

[30] Foreign Application Priority Data

Aug. 11, 1978 [JP] Japan ................................. 53-97404

[51] Int. Cl.³ ............................................. F26B 5/04
[52] U.S. Cl. ........................................ 34/15; 34/36; 34/80
[58] Field of Search ................................ 34/15, 36, 80

[56] References Cited

U.S. PATENT DOCUMENTS

| | | | |
|---|---|---|---|
| 1,866,346 | 7/1932 | Clark | 34/15 |
| 4,063,367 | 12/1977 | Talalay | 34/15 |

*Primary Examiner*—John J. Camby
*Attorney, Agent, or Firm*—Sherman & Shalloway

[57] ABSTRACT

A liquid food, a medicine or a natural food to be dried is subjected to vacuum evaporation and drying with a dry gas simultaneously or alternately, and by this drying method, the substance is effectively dried without freezing of the substance. A gas containing volatile components, which is discharged from the drying step, is introduced into an absorption layer and is regenerated to a drying gas while the volatile components of the substance, such as aroma, are recovered in the form of a liquid. In this drying method, the drying process is carried out entirely in a closed circuit system.

10 Claims, 1 Drawing Figure

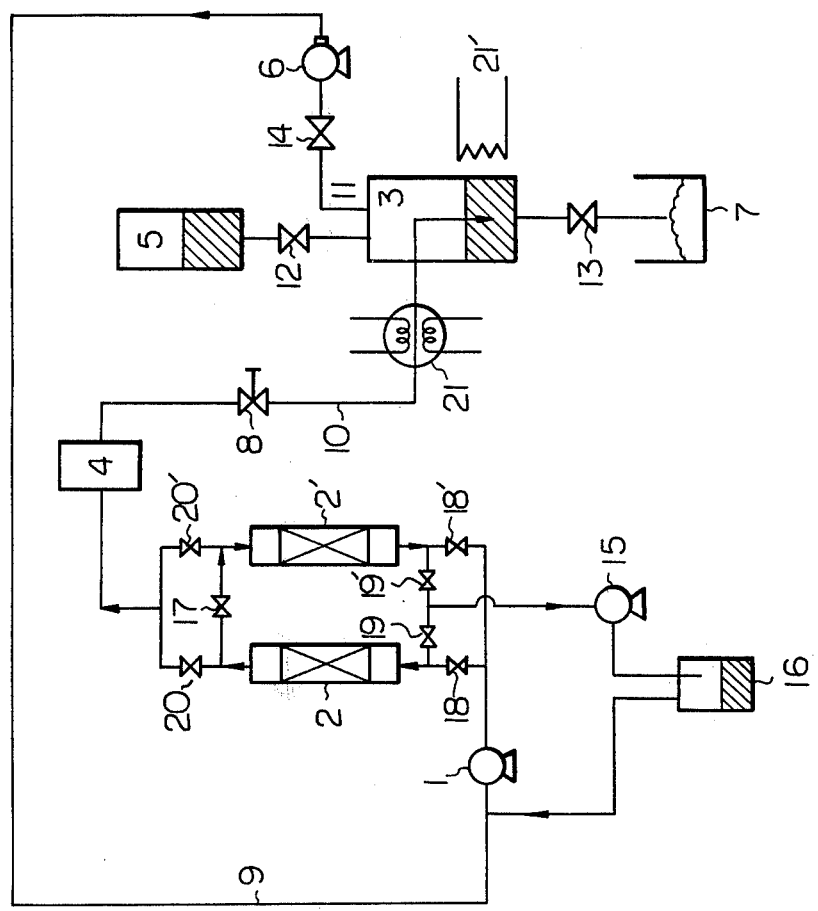

METHOD FOR DRYING WATER-CONTAINING SUBSTANCES

BACKGROUND OF THE INVENTION (1) Field of the Invention

The present invention relates to a drying method. More particularly, the present invention relates to a method for preparing a dry product from a food, a medicine or the like without substantial deterioration of nonvolatile components contained therein. Furthermore, the present invention relates to a method for drying a food, a medicine or the like without discharge of volatile components contained in the substance to be dried, in the form of a gas to the outer atmosphere.

(2) Description of the Prior Art

As the method for drying a liquid food or medicine at a relatively low temperature to form a powdery dry product, there have been known a so-called freeze-drying method and a hot air drying method.

In the freeze-drying method, a solution or the like is kept under a high vacuum and ice formed by freezing is sublimated to enhance drying. According to this method, however, since the structure of cells in the substance to be dried is broken, it is often observed that the resulting dry powdery product is different from the original liquid food or the like with respect to the composition of the ingredients and the texture. Furthermore, in order to increase the drying speed, such a high vacuum as about $10^{-2}$ mmHg is necessary and hence, the method requires expensive equipment. Moreover, heat necessary for sublimation of ice can only be supplied by heat conduction, and as dried zone of a food or the like advances from the bottom portion in contact with a heating wall to the surface, the food or the like becomes porous and its heat conductivity is reduced. Accordingly, the time necessary for drying is prolonged because of reduction of the heat conductivity and resulting reduction of the drying speed, and therefore a large amount of energy is required for completion of the drying. Still further, according to this method, although water separated in the form of ice can be sublimated and removed, water contained in solids cannot be removed completely and it is impossible to reduce the water content below several percent, because some water remains adsorbed in solids.

In the hot air drying method, by contacting a solution or the like with hot air, its water and the like are removed in the state of vapour by the drying gas. This method is advantageous in that the operation is relatively simple, but a large quantity of hot air as the drying gas is necessary and deterioration of the substance to be dried is often caused by the high temperature operation.

Moreover, these conventional drying methods involve a problem of air pollution by odour and, smelling components and waste of valuable flavor components and other volatile components discharged together with water vapor and drying air.

OBJECTS OF THE INVENTION

It is therefore a primary object of the present invention to provide a drying method in which a food, a medicine or the like is dried at a relatively low temperature in a short time without freezing of the substance to be dried to substantial deterioration of non-volatile components contained therein.

Another object of the present invention is to provide a drying method in which separation of a drying gas and volatile components contained in discharged gas out of a drying chamber can be accomplished in a completely closed system and hence, recycle of the drying gas and recovery of the volatile components become possible.

SUMMARY OF THE INVENTION

In accordance with one fundamental aspect of the present invention, there is provided a drying method comprising the steps of (A) exposing a substance to be dried to a reduced pressure of 1 to 600 mmHg (absolute pressure) to vacuum-evaporate volatile components contained in said substance without freezing of said substance and (B) contacting said substance uniformly with a drying gas having a dew point of $-75°$ to $0°$ C. to evaporate the volatile components and elevate the temperature of said substance, said steps (A) and (B) being conducted simultaneously or alternately, whereby said substance is formed into a dry product without freezing of said substance.

In accordance with the present invention, there is provided a preferred embodiment of the above-mentioned drying method, which comprises the steps of introducing a volatile component-containing gas discharged from said step (A) and/or said step (B) into one of a pair of beds packed with an adsorbent capable of selectively adsorbing the volatile components to regenerate said gas to dryness of a dew point of $-75°$ to $0°$ C. and recycling the regenerated drying gas to said step (B), changing over introduction of said volatile component-containing gas from said one adsorption bed to the other adsorption bed before the amount of the volatile components adsorbed in one adsorption bed reaches a saturation level, reducing the pressure in said one adsorption bed below the level of the pressure of said volatile component-containing gas, feeding a part of the drying gas discharged from the other adsorption bed or a drying gas from the outside of the system into said one adsorption bed in an amount smaller than the amount of said volatile component-containing gas to thereby desorb the volatile components adsorbed in said one adsorption bed, performing said adsorption and desorption operations repeatedly on said paired adsorption beds alternately, and mixing the desorption gas obtained by said desorption operation with the volatile component-containing gas, if desired, after separation of condensed volatile components in said desorption gas, and recycling the gaseous mixture into one of said paired adsorption bed.

BRIEF DESCRIPTION OF THE DRAWING

The accompanying drawing is a flow sheet illustrating an apparatus which is advantageously used for practising the drying method of the present invention.

DETAILED DESCRIPTION OF THE PREFERRED EMBODIMENTS

The most important feature of the present invention resides in that the operation of subjecting a substance to be dried, such as a solution or dispersion, to vacuum evaporation without freezing thereof and the operation of blowing a drying gas into the solution or dispersion are conducted simultaneously or alternately as pointed out hereinbefore. The vacuum evaporation is advantageous in that a solvent such as water contained in the solution or dispersion can be effectively evaporated even at a relatively low temperature, but the liquid temperature is gradually lowered because of latent heat of the solvent evaporation and freezing is finally developed to render continuation of the operation impossible. According to the present invention, the vacuum evaporation is stopped before freezing of the solution or dispersion takes place, and the drying gas is blown into the solution or dispersion. The drying gas exerts functions of evaporating the solvent contained in the solution or dispersion and elevating the temperature of the solution or dispersion. If the solution or dispersion in which the temperature has thus been elevated is subjected to vacuum evaporation again, removal of the solvent by evaporation is accomplished very effectively. If these two operations are conducted repeatedly, a highly concentrated dry powder product can be obtained in a much shorter time than the operation time required in the conventional drying methods. Of course, also when the operation of blowing the drying gas into the solution or dispersion and the vacuum evaporation are carried out simultaneously at a certain temperature and a certain degree of vacuum, the above-mentioned advantages can be throughly attained. This embodiment is advantageous in that the drying process is conducted in a continuous manner.

According to the present invention, by combining the above-mentioned two operations in the foregoing manner, the time necessary for drying can be remarkably shortened as compared with the conventional drying methods. For example, the necessary drying time in the present invention is shortened to about 1/10 to about ⅓ of the necessary drying time in the freeze-drying method.

Furthermore, in the present invention, since the solution or dispersion is dried at a relatively low temperature without freezing thereof, such troubles as destruction of the structure of cells and destruction of the texture of a food are not caused by freezing and deterioration of the substance to be dried owing to heating can be prevented while retaining far more perfume or flavor in the original state than the conventional drying methods.

Still further, by combining the operation of blowing the drying gas into the substance to be dried with the vacuum evaporation, a powder product can be prepared from a viscous substance or solution from which a solid can hardly be crystallized out by the conventional concentrating or drying processes. Moreover, according to the present invention, a powder dried below a critical water content, for example, a product having a water content of substantially 0%, can be obtained if desired. Because the dry gas has the capacity to desorb even the small amount of adsorbed water on the solid.

Still in addition, in the present invention, a freezer need not be used and a relatively low degree of vacuum id adopted, and therefore, the method of the present invention is advantageous over the conventional freeze-drying method in the point that the equipment can be remarkably reduced and energy costs such as power costs can be reduced to, for example, levels corresponding to less than ½ ~ ⅓ of the energy expenses required in the conventional freeze-drying method.

Moreover, since the operation is carried out in vacuo, a high effect can be attained even with the use of a small amount of the drying gas which is expanded in vacuo. When an inert gas such as nitrogen is employed, since recycle of the dry inert gas can work, the operation can be conducted in a completely closed system without fresh make-up of nitrogen.

Furthermore, by this invention, a liquid food or pharmaceuticals can be recovered in the form of a recrystallized powder, and flavor components or other volatile components can be recovered in the form of a solution without discharging to open air.

The present invention can be advantageously applied to concentration and drying of a solution or dispersion. Accordingly, the present invention will now be described in detail by reference to this embodiment, though the present invention is not limited to this embodiment.

As the solution or dispersion, there are optionally used known liquid foods and medicines. As suitable examples, there can be mentioned condiments such as soy sauce and other sauces, foods such as various soups, miso soup, coffee, various fruit and vegetable juices, miso paste, york, albumen and milk, and pharmaceuticals, pharmaceutical intermediates and fine chemicals such as antibiotic substances, various fungi and bacteria, yeasts, vaccines and various natural product extracts. Most of these solutions and dispersions contain water as the solvent. Solutions or dispersions containing an organic solvent such as methanol, ethanol or acetone or its mixture with water, for example, natural product extracts, may be dried according to the method of the present invention. The amount of the solvent contained in the solution or dispersion is not particularly critical, and solutions or dispersions having a relatively low water content, such as york and albumen as well as solutions or dispersions having a relatively high water content, such as coffee, can be dried according to the method of the present invention. For examples, the water content may be in the range of from 50 to 99.9% by weight in the solution or dispersion to be dried.

In one embodiment of the method of the present invention, the operations (A) and (B) are conducted in this sequence. More specifically, a solution or dispersion is first exposed to a reduced pressure of 1 to 160 mmHg (absolute pressure), especially 5 to 30 mmHg (absolute pressure) and the solvent contained in the solution or dispersion is evaporated. The degree of the vacuum pressure by the present invention is much lower than by the conventional freeze-drying method in which a high vacuum is adopted. If the pressure is lower than 1 mmHg, there is a risk of freezing of the solution or dispersion, and as the degree of the vacuum pressure becomes lower, a longer time is necessary for removal of the solvent such as water.

As the vacuum evaporation proceeds, the liquid temperature is gradually reduced by the latent heat of the solvent evaporation. According to this embodiment of the present invention, the vacuum evaporation is stopped before freezing of the solution or dispersion. The stop point of the vacuum evaporation may be detected and determined by various means, for example, the temperature of the solution or dispersion.

The vacuum evaporation may be performed by charging a solution or dispersion in a certain vessel to a certain level and connecting this vessel to an appropriate vacuum device. The solution or dispersion may be agitated or kneaded to perform vacuum evaporation uniformly on the entire solution or dispersion. Alternately, there may be adopted a method in which the pressure in the vessel is reduced and the solution or dispersion is fed into the vessel in the form of a thin film, a fine stream or a spray to effect vacuum evaporation.

For the effective recovery of the solvent or perfume component, vacuum pumps such as a rotary vacuum pump, a Nash type vacuum pump, a recipro type vacuum pump and a Roots vacuum pump are preferably employed as the vacuum device. When recovery of the flavor component is not required, an ejector or the like may be used as the vacuum device.

According to the present embodiment, the solution or dispersion which has been subjected to the vacuum evaporation is contacted uniformly with a drying gas having a dew point of −75° to 0° C., particularly −73° to −50° C. By this contact with the drying gas, water contained in the solution or dispersion is evaporated in the drying gas, and the temperature of the solution or dispersion is gradually elevated by uniform contact with the drying gas.

As the drying gas, there are advantageously used inert gases such as nitrogen and carbon dioxide gas. When components contained in the solution or dispersion do not tend to be oxidized, air may be used as the drying gas. The temperature of the drying gas is adjusted at a level higher than the freezing point of the solution or dispersion. Generally, the temperature of the drying gas is selected in the range of 10° to 50° C., preferably 20° to 40° C., according to the kind of the solution or dispersion to be treated. Ordinarily, the intended effects can be attained when the drying gas is maintained at the atmospheric pressure. It must be noted, however, that a gas under a reduced or elevated pressure may be used if necessary.

The method for contacting the solution or dispersion with the drying gas is not particularly critical, so far as uniform contact is attained between the solution or dispersion and the drying gas. For example, there may be adopted a method in which the solution or dispersion is supplied into the drying gas in the form of a thin film stream, a fine stream or a spray to effect uniform contact therebetween.

It is preferred in the present embodiment that the operation of contacting the solution or dispersion with the drying gas to be terminated at a point when the temperature of the drying gas is equilibrated with the temperature of the solution or dispersion. Generally, it is preferred that the contacting operation be conducted until the temperature of the solution or dispersion is elevated to a level higher by at least 20° C. than the freezing-initiating point of the solution or dispersion but lower than 50° C. and the subsequent vacuum evaporation be then initiated.

In an ordinary case, sufficient contact can be accomplished if the drying gas is introduced in the solution or dispersion in the evacuated vessel or to the surface of the solution or dispersion so that the pressure in the vessel is returned to the atmospheric pressure. If desired, the introduction of the drying gas is continued even after the pressure in the vessel has been returned to the atmospheric pressure to discharge the gas containing the solvent such as water from the vessel, whereby the time for contact between the drying gas and the solution or dispersion can be prolonged. Especially at the stage close to termination of drying, in order to remove adsorbed water on solids completely, it is preferred that degasification be carried out under a reduced pressure or vacuum in the vessel while introducing the drying gas into the vessel.

In the present invention, if the operation of contacting the solution or dispersion with the drying gas is interposed between every two adjacent cycles of the multi-staged vaccum evaporation, the time necessary for concentration and drying can be remarkably shortened. As pointed out hereinbefore, by the contact of the solution or dispersion with the drying gas, the functions of elevating the temperature of the solution or dispersion and evaporating the solvent from the solution or dispersion can be attained, and it is notified that this contacting operation promotes evaporation of the solvent at the subsequent vacuum evaporation. This presumption is well in agreement with the experimental fact that if one cycle time of vacuum evaporation/drying gas contact operation is shortened and the repetition frequency of this operation cycle is increased, evaporation of the solvent is prominently promoted in a fixed drying time.

The solution or dispersion can be heated from the outside by heat conduction, radiation heating or induction heating to supplement the heat given by the operation of contacting the solution or dispersion with the drying gas, if necessary.

The frequency of repetition of the cycle of vacuum evaporation operation/drying gas contact operation is determined according to the content of the solvent such as water in the solution or dispersion and the state of contact of the solution or the dispersion with the drying gas atmosphere. Roughly, a concentrated dry powder having a high quality can be obtained in a relatively short time if this opertion cycle is repeated 2 to 20 times, particularly 5 to 10 times.

In accordance with another preferred embodiment of the present invention, the operation of evacuating the vessel filled with the solution or dispersion by a vacuum pump and the operation of blowing the drying gas into the vessel are simultaneously conducted. In other words, in this embodiment, the time for one cycle of vacuum evaporation operation/drying gas contact operation is infinitely shortened. The evaporation of the solvent per unit time is most effective in this embodiment. The pressure in the vessel can be up to about 600 mmHg in this embodiment, but a pressure of 1 to 160 mmHg is preferred as in the foregoing embodiment. The conditions and operation procedures may be the same as described hereinbefore with respect to the foregoing multi-staged embodiment.

Charging of the solution or dispersion into the vessel and withdrawal of a dry product from the vessel may be performed continuously or batchwise. In the former case, the feed solution or disperson is charged from one end of a continuous drying apparatus equipped with vanes for transporting and agitating the solution or dispersion and the dry product is withdrawn from the other end through a rotary valve or storage tank. Contact of the substance to be dried with the drying gas may be carried out in a concurrent or counter-current manner.

In the present invention, the solvent-containing gas discharged from the vacuum evaporation step (A) and/or the drying gas contact step (B) is passed through a bed packed with an adsorbent capable of selectively adsorbing the solvent to regenerate the gas to dryness of a dew point of −75° to 0° C. and this regenerated gas can be recycled to the contact step (B), whereby the consumption of an inert gas or the like can be remarkably reduced and components evaporated together with the solvent, such as the aroma component, can be recovered effectively. Furthermore, the whole operation can be performed, in a closed system.

In this embodiment of the present invention, known adsorbents such as zeolite, silica gel, alumina gel, molecular sieve and active carbon may be used as the adsorbent. The solvent and volatile components such as aroma adsorbed on the adsorbent can easily be recovered in a liquid state by passing a carrier gas through the used adsorption bed under a reduced pressure.

The regenerated gas obtained by passing the discharge gas through the adsorption bed may be directly recycled to the above-mentioned step (B), or the regenerated gas may be heated by the above-mentioned temperature range prior to recycle to the step (B) if desired.

The present invention can be practised very advantageously by using an apparatus illustrated in the flow sheet of the accompanying drawing.

Referring to the figure a drier 3 is connected to a drying gas tank 4 through a pipe 10 and a valve 8 and to a vacuum pump 6 through a pipe 11 and a valve 14. Moreover, the drier 3 is connected to a solution tank 5 through a valve 12 and to a product storage tank 7 through a valve 13. The discharge side of the vacuum pump 6 is connected to a blower 1 through a pipe 9, and gas driers (adsorbers) 2 and 2' are disposed between the blower 1 and the drying gas tank 4. Incidentally, a plurality of driers 3 may be disposed if desired.

Valves 18 and 18' are disposed on the inlet sides of the gas driers (adsorbers) 2 and 2', and valves 20 and 20' and a valve 17 connecting them are disposed on the discharge sides of the gas driers 2 and 2'. A vacuum pump 15 is connected to the gas driers 2 and 2' through valves 19 and 19', and the discharge side of this vacuum pump 15 is connected to the introduction side of the blower 1 through a solvent (water) tank 16.

At the drying operation, the valve 12 is opened to charge a predetermined amount of a solution to be treated into the drier 3 from the solution tank 5, and simultaneously, the valve 14 is opened to actuate the vacuum pump 6. As the pressure in the drier 3 is reduced, evaporation of the solvent (water) is accelerated and the solution is concentrated while the liquid temperature is lowered by the evaporation latent heat of the solvent.

The valve 14 is closed before freezing of the solvent, and the valve 8 is opened to feed a drying gas into the drier 3. When the pressure in the drier 3 is returned to the atmospheric pressure, the valve 8 is closed. At this point, in order to return the temperature of the solution to a predetermined level, for example, the normal temperature, the drying gas to be introduced may be preheated by a heater 21 or the solution per se may be heated by a heater 21'.

Then, the valve 14 is opened again and the pressure in the drier 3 is reduced by the vacuum pump 6 to evaporate the solvent, and the valve 14 is closed before freezing of the solution.

The above-mentioned two steps are repeated alternately or these two steps are conducted simultaneously, whereby concentration and drying of the solution can be accomplished at a relatively low temperature in a very short time. The resulting dry powdery product is discharged into the tank 7 through the valve 13. The starting solution is charged again in the drier 3 from the tank 5 through the valve 12, and the drying operation is repeated again.

The solvent-containing gas discharged from the vacuum pump 6 is introduced into one of adsorption columns 2 and 2' through the pipe 9, if necessary, by using the blower 1. An adsorbent capable of adsorbing water, aroma components and hydrocarbons, such as silica gel, molecular sieve or active carbon is packed in the adsorption columns 2 and 2'.

Water, aroma components and other volatile components are completely removed from the gas while it is passed through the adsorption column 2 and this gas free from the above components is introduced as the drying gas into the drier 3 through the valve 8, if necessary, after storage in the tank 4. Before the adsorption column 2 is saturated with the adsorbed substances, introduction of the solvent-containing gas is changed over to the other adsorption column 2'. The pressure in the adsorption column 2 is reduced by the vacuum pump 15 and the adsorbed substances are desorbed by using a part of the drying gas from the valve 17 as a carrier gas. Condensates of water and the like are stored in the tank 16 and the uncondensed gas is recycled to a suction opening of the blower 1.

In the foregoing manner, the wet gas from the drier 3 is completely dried by the gas driers 2 and 2' and valuable components such as aroma components are completely removed therefrom. Then, the resulting dry gas is fed as the drying gas to the drier 3 through the tank 4, valve 8 and pipe 10.

Water and other adsorbed components are stored in the tank 16 in the form of an aqueous solution.

The present invention will now be described in detail by reference to the following Examples that by no means limit the scope of the invention.

EXAMPLE 1

The concentrating and drying operation was carried out by using an apparatus as shown in FIG. 1. More specifically, a solution of 50 mg of an antibiotic substance in 2 ml of distilled water, which was maintained at the normal temperature and filled in an ampoule, was set in the drier 3 having an inner capacity of 3 liters, and the valve 8 was closed and the valve 14 was opened. The vacuum pump 6 having a capacity of 100 l/min was operated and the vacuum evaporation operation was conducted for 8 minutes under a reduced pressure of 3 to 4 mmHg. It was found that at this point, the liquid temperature was reduced to 2° to 4° C. Then, the valve 14 was closed and the valve 8 was opened, dry nitrogen gas having a dew point of $-73°$ C. was fed as the drying gas into the drier 3 at a rate of 10 l/min. When blowing of the drying gas was conducted for 10 minutes, the liquid temperature was elevated to about 28° C. Then, the valve 8 was closed and the valve 14 was opened, and the vacuum evaporation was conducted by using the vacuum pump 6. In the foregoing manner, the cycle of vacuum evaporation operation/drying gas contact operation was repeated 7.5 times as a whole, and during this treatment, the liquid temperature was changed in the range of about 5 to about 28° C. The solution was completely converted to a powder in 140 minutes.

It was found that the water content in the powder was 1% by weight and the powder was crystalline.

Generally, about 6 hours are required for freeze-drying of an antibiotic substance. In view of this fact, it will readily be understood that according to the drying method of the present invention, a concentrated dry powder having excellent properties can be obtained in an extremely short time.

EXAMPLE 2

Yeast having a water content of 50 to 60% by weight was charged in a Petri dish so that the surface area was 30 cm$^2$ and the thickness was 10 mm. The Petri dish was placed in the drier having an inner capacity of 3 liters and the concentrating and drying operation was carried out in the same manner as described in Example 1. The vacuum evaporation was conducted for 8 minutes under a reduced pressure of 3 to 4 mmHg, and the contact with the drying gas having a dew point of −73° C. was conducted at a gas flow rate of 10 l/min for 10 minutes. This cycle of vacuum evaporation operation/drying gas contact operation was repeated 4 times over a period of about 70 minutes to obtain a complete powder. From results of microscope observation, it was found that the powder had a definite crystal form.

Generally, 5 to 6 hours are required for powdering yeast according to the conventional freeze-drying method, and yeast can hardly be obtained in the crystal form according to the conventional freeze-drying method. In contrast, as will readily be understood from the foregoing experimental results, according to the present invention, yeast can be concentrated and dried to the crystal form in a very short time.

EXAMPLE 3

In the drier having an inner capacity of 3 liters was placed 10 cc of soy sauce, and the concentrating and drying operation was carried out in the same manner as described in Example 1. More specifically, the vacuum evaporation was carried out under a reduced pressure of 3 to 4 mmHg for 8 minutes, and the contact with the drying gas having a dew point of −73° C. was conducted for 10 minutes at a drying gas flow rate of 10 l/min. This cycle of vacuum evaporation operation/drying gas contact operation was repeated for about 3 hours to obtain a crystalline powder having a high moisture-absorbing property.

A sample diluted the above concentrated and dried powdery soy sauce with water (this Example), original soy sauce ( Comparison 1) and commercially available powdered soy sauce formed by hot air drying (Comparison 2) were subjected to the organoleptic examination by a panel of 4 experts. All the experts confirmed that the sample of this Example was not different from the sample of Comparison 1 with respect to the taste and flavor and that the sample of this Example was excellent over the sample of Comparison 2 with respect to the taste and flavor.

EXAMPLE 4

Coffee (150 cc) obtained by extracting coffee beans with hot water was rapidly cooled to 30° C. and placed in the drier having an inner capacity of 3 liters in the same apparatus as used in Example 1. The vacuum evaporation operation was conducted for 8 minutes under a reduced pressure of 3 to 4 mmHg and the drying gas contact operation was conducted at a drying gas flow rate of 18 l/min for 10 minutes. By the vacuum evaporation operation, the liquid temperature was lowered from 30° C. to about 5° C. and the pressure was reduced to 3 to 4 mmHg. By blow-in of the drying gas, the liquid temperature was elevated to about 30° C.

This cycle of vacuum evaporation operation/drying gas contact operation was repeated for 8 hours to obtain a concentrated and dried coffee powder.

For comparison, the drying and concentrating operation was conducted only by introducing the above-mentioned drying gas at a flow rate of 18 l/min without vacuum evaporation. About 23 hours were necessary for obtaining a concentrated and dried coffee powder (Comparison 1).

The powdery coffee of this Example, the powdery coffee of Comparison 1, a commercially available instant coffee obtained by freeze-drying (Comparison 2) and the original coffee (Comparison 3) were subjected to organoleptic examination by a panel of 6 experts. The taste and flavor of each coffee were evaluated in such a manner as giving 4 points to the best coffee, 3 points to the next, 2 points to the 3-ranked coffee and 1 point to the worst coffee. Obtained results are shown in Table 1.

TABLE 1

|  | Taste (points) | Flavor (points) |
| --- | --- | --- |
| This Example | 18 | 19 |
| Comparison 1 | 16 | 10 |
| Comparison 2 | 6 | 7 |
| Comparison 3 | 20 | 22 |

From these results, it will readily be understood that a powdery coffee of good taste comparable to the original coffee can be obtained according to the present invention, though slightly inferior to the original coffee with respect to the flavor.

EXAMPLE 5

By using the same apparatus as used in Example 1, Welsh onion was dried. More specifically, 100 g of Welsh onion cut into pieces about 10 mm in the length and having a water content of about 90% was placed in the drier 3 equipped with a heater. Both the valves 8 and 14 were opened, and while introducing dry air continuously at a flow rate of 1 Nl/min, the vacuum pump 6 was operated so that the interior of the drier 3 was maintained at a temperature of 50° C. and a pressure of 30 mmHg (absolute pressure). The amount evaporated of water (the weight decrease) was measured as shown in Table 2.

TABLE 2

|  | Weight Decrease |
| --- | --- |
| after 1 hours' operation | 46 g |
| after 2 hours' operation | 66 g |
| after 3 hours' operation | 80 g |
| after 4 hours' operation | 90 g |

As will be apparent from the above results, the Welsh onion was substantially bone-dried after 4 hours' operation.

In view of the fact that about 12 to about 24 hours are necessary for drying Welsh onion to a water content of about 8% according to the conventional freeze-drying method, it will readily be understood that drying can be accomplished in a very short time according to the present invention.

The present invention can be applied to drying of not only solutions and dispersions but also other various substances. For example, the present invention can be applied to drying of solid foods such as vegetables, fruits, grains, meats and processed foods thereof, wood materials, rubbers, resins, powdery and crystalline chemicals and gel products such as silica gel and alumina gel, and the drying can be accomplished in a very short time without deterioration of these starting substances. Moreover, by virtue of the advantage that the drying treatment can be performed in a closed circuit system and volatile components such as smelling components are not discharged to open air, the present invention can be advantageously applied to drying of various industrial waste waters, industrial wastes, sludges, stock raising wastes, etc.

What is claimed is:

1. A drying method comprising the steps of (A) exposing a substance to be dried to a reduced pressure of 1 to 600 mmHg (absolute pressure) to evaporate in vacuum the volatile components contained in said substance without freezing of said substance, (B) contacting said substance uniformly with a drying gas having a dew point of −75° to 0° C. to evaporate the volatile components and elevate the temperature of said substance, said steps (A) and (B) being conducted simultaneously or alternately, whereby, said substance is formed into a dry product without freezing of said substance, and introducing a gas containing said volatile components discharged from said step (A) and/or said step (B) into one of a pair of beds packed with an adsorbent capable of selectively adsorbing the volatile components to regenerate said gas free from volatile components to dryness of a dew point of −75° to 0° C. and recycling the regenerated drying gas to said step (B), changing over introduction of said volatile component-containing gas from said one adsorption bed to the other adsorption bed before the amount of the volatile components adsorbed in said one adsorption bed reaches a saturation level, reducing the pressure in said one adsorption bed below the level of the pressure of said volatile component-containing gas, feeding a part of the drying gas discharged from the other adsorption bed or a drying gas from the outside of the system into said one adsorption bed in an amount smaller than the amount of said volatile component-containing gas to thereby desorb the volatile components adsorbed in said one adsorption bed, performing said adsorption and desorption operations repeatedly on said paired adsorption beds alternately, and mixing the desorption gas, obtained by said desorption operation, with the volatile component-containing gas, if desired, after separation of condensed volatile components in said desorption gas, and recycling the gaseous mixture into one of said pair of adsorption beds.

2. A drying method according to claim 1 wherein the substance to be dried is a solution or dispersion.

3. The drying method according to claim 1, wherein steps (A) and (B) are conducted consecutively.

4. The drying method according to claim 3, wherein step (B) is continued until the temperature of said substance is elevated to a temperature which is at least 20° C. higher than the freezing-initiating point of the substance but lower than 50° C.

5. The drying method according to claim 1, wherein steps (A) and (B) are conducted simultaneously.

6. The drying method according to claim 1, wherein the drying gas has a dew point of −73° C. to −50° C.

7. The drying method according to claim 1, wherein the drying gas has a temperature in the range of 10° to 50° C.

8. The drying method according to claim 1, wherein the reduced pressure of step (A) is in the range of 1 to 160 mmHg (absolute pressure).

9. The drying method according to claim 1, wherein the substance to be dried is a food.

10. The drying method according to claim 1, wherein the substance to be dried is a medicine.

* * * * *